April 6, 1965     I. G. BRENNER     3,177,275
METHOD AND MEANS FOR PRODUCING FIBROUS ARTICLES
Filed Nov. 10, 1960     2 Sheets-Sheet 1

INVENTOR.
IVAN G. BRENNER
BY
ATTORNEYS

April 6, 1965     I. G. BRENNER     3,177,275

METHOD AND MEANS FOR PRODUCING FIBROUS ARTICLES

Filed Nov. 10, 1960     2 Sheets-Sheet 2

INVENTOR.
IVAN G. BRENNER
BY
ATTORNEYS

United States Patent Office 3,177,275
Patented Apr. 6, 1965

3,177,275
METHOD AND MEANS FOR PRODUCING
FIBROUS ARTICLES
Ivan G. Brenner, 247 Moull, Newark, Ohio
Filed Nov. 10, 1960, Ser. No. 68,540
9 Claims. (Cl. 264—128)

This invention relates to the production of fibrous articles and more particularly to the production of a base product of discontinuous fibers which is used to reinforce shaped resinous articles.

Recently composite materials of many types have come to the forefront. Composites having matrices of organic resins, such as polyesters, epoxys, acrylics and phenolics, which are reinforced with fibrous materials have been widely used and among the most successful of these composite materials. Nylon and rayon fibers have often been used to reinforce these resins and where a low cost reinforcing material is needed, hemp and sisal have been utilized advantageously. However, one of the best known and most widely accepted materials for reinforcing organic resins and many other materials is fibrous glass. Ordinarily the fibrous glass is in the form of fine, substantially continuous, filaments which are combined into multifilament strands and yarns or broken into short lengths. The present invention will be described herein with particular reference to the utilization of glass textile fibers as the reinforcing material although it will be recognized that other fibers, including sisal, hemp, bagasse, jute, and numerous other natural animal and vegetable fibers as well as a multitude of synthetic fibers including nylon and rayon, and inorganic fibers such as mineral wool, rock wool, and asbestos, or any combination thereof, with or without glass fibers may also be used.

Glass textile fibers are formed by melting glass in a feeder having a bottom provided with many small orifices. The molten glass is flowed through these orifices as streams which are attenuated by a revolving mandrel located below the feeder to form continuous textile fibers. These continuous textile fibers are grouped into a strand, for example of about 204 filaments, and are in this form collected on the mandrel.

Often 40 or more of these strands are collected in parallel, side-by-side relationship to form a roving. At other times a strand is looped back and forth upon itself to form a pseudo-roving. These rovings are chopped to short lengths and are gathered as a mat which may be subsequently used as the reinforcing material in the production of trays, etc. made of resins reinforced with the fibrous glass.

When molding contoured reinforced resin articles such as hats, trays, or boat hulls, it is frequently the practice to first form a loosely integrated mass or preform of glass fibers conforming to the general shape of the final product. This is done by collecting the fibers and a small amount of resinous binder on a foraminous mold which has the same general contour as the article to be molded. The mold with the preformed mass of loosely bonded fibers thereon is removed from the forming chamber and placed in a heated oven to cure the binder and tightly adhere the fibers together at their interstices. The cured preform is then removed from the mold. This preform is adaptable to being folded and stored before final processing to the finished article is effected, whereupon the preform is placed in a press and resin in a sufficient amount is added to provide the matrix for the finished article. The press is then closed and heat is applied to cure the resinous matrix. The composite article is then removed from the mold and any excess material or flashing is removed.

Such preforms are usually produced by introducing chopped lengths of glass strands as a stream of fibers into the top of a forming chamber and distributing the chopped lengths throughout the cross section of the chamber to effect deposition of a uniform layer on the foraminous collecting surface or mold.

While this stream of chopped strands is being disrupted one difficulty frequently encountered is that many of the chopped lengths of strands are thrown against the side walls of the forming chamber and are adhered there by the binder which is sprayed into the forming chamber to integrate the strands which are collected on the mold. These strands accumulate on the side walls and eventually form rather large, dense, clumps which ultimately fall into the pack on the foraminous collection surface. The binder holding these strands together often becomes cured before the clump of strands fall from the side walls into the pack. Such fallen clumps do not lend themselves to being securely integrated with the body of chopped strands during curing of the mat or pack. Instead, the clumps remain as somewhat individualized, extraneous, tightly bonded masses within the main mass of strands and lessen the overall integrity of the preform. When the clump falls from the wall during the early stages of the production of a particular preform it may be covered with strands or fibers deposited thereafter, in which case it forms a weaker zone or defect in the preform as described above. On the other hand, when it falls into a nearly completed preform, or into a mat immediately before it leaves the forming chamber, it appears as a protruding blemish which prevents the formation of a smooth surfaced reinforced article. This condition is particularly aggravated when the walls of the forming chamber are not cleaned at regular intervals.

In view of the foregoing, an object of this invention is to provide an economical and more efficient method and apparatus for producing mats or preforms of fibrous materials.

A further object of this invention is to provide a process for forming mats or preforms of fibrous mats in a confined space which is substantially free of buildup on the means defining such space.

Another object of this invention is to produce a more uniform mat or preform which is substantially free of extraneous accumulations of fibers and resin.

To meet these objectives the present invention provides a more effective method for preventing buildup on the sides of the forming chamber than heretofore existed. To accomplish this, a thin planar stream or continuously moving wall of gases is provided in encompassing relation with the descending stream of chopped strand lengths. These gases are provided with sufficient kinetic energy that the chopped strand lengths will not pass therethrough and consequently they will not contact the sides of the forming hood.

A feature of the invention lies in the fact that the air blown into the forming chamber to entrain the strand lengths provides a means for close control of their movement as well as aiding their descent to the foraminous collecting surface for increased rates of production.

Further objects and advantages of this invention will become apparent from the following description and accompanying drawings which illustrate an embodiment exemplary of my invention without intention that it be limited solely thereto.

Figure 1:
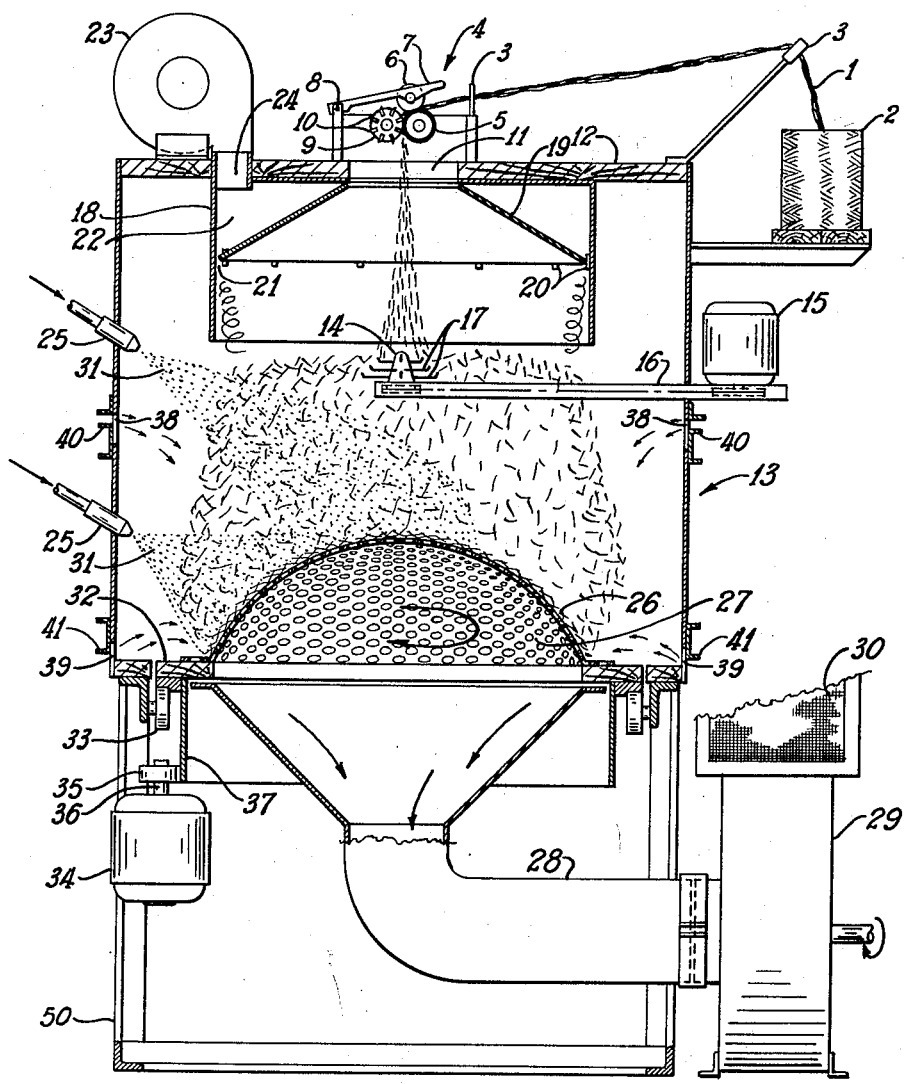
FIGURE 1 is a sectional elevation view of apparatus for producing preforms according to the principles of the present invention.

Referring to FIGURE 1 continuous glass filaments in the form of strands which have been combined to form rovings 1 are drawn from a plurality of packages 2 mounted on a creel. These rovings 1 pass through a pair of spaced guide eyes 3 which direct their path of movement and prevent their catching on the sides or top of the forming chamber 13. Severing or chopping means 4 are located above the forming chamber to break or cut the strands into short lengths. The strands may all be cut to the same length or they may be cut to varying lengths and the assorted lengths fed into the forming chamber. In either case the strands are usually cut to a length falling in the range of from ¼" to 6".

One type of severing means which may be used is a chopper such as as disclosed in United States Patent 2,719,336 comprising a conveying roll 5 which engages the strands or roving and pulls them from the package 2. A pressure roll 6 rests against the conveying roll 5 which is usually made of hard rubber and assures that the contact between the strands 1 and the conveying roll 5 is sufficient to pull them from the creel. The pressure roll 6 is mounted on a handle 7 which is pivotally joined to the forming chamber at point 8. This pivotal mounting allows the pressure roll 6 to be lifted out of its position of contact with the conveying roll 5 thereby facilitating the starting of the strand between the conveying roll and a co-acting cutting roll which has hardened steel cutting members 10 located about its periphery and extending beyond its surface. These steel blades force the glass filaments against the hard rubber roll and cuts them to a desired length depending upon the spacing of the cutting members in the roll 9. Because the pressure roll 6 is not located exactly above the conveying roll 5 but is positioned to contact it on the side toward the cutting roll 9, the strands 1 are directed downward toward the cutting roll 9 thereby preventing their slipping over it. If it is desirable to cut the strands into varying lengths, more than one cutter may be used, or the steel blades 10 may be spaced at uneven intervals around the cutting roll 9.

The cut strands from the chopper 4 fall freely downward as a stream into a forming chamber 13 mounted on a base 50. They enter the forming chamber through an opening 11 located centrally in its top 12. In some instances it is desirable to collect the short lengths of strands from the chopper in a hamper or other storage device and later dump or meter them into the forming chamber. Other types of fibers may be advantageously mixed with the glass strands in the hamper and this mixture metered into the forming chamber. These other fibers may be fed into the forming chamber at the same time the glass strands are being fed directly thereto from the chopper 4. Also, the cut glass strands and other fibers may be fed to the forming chamber by conveying them with air through a tube which exhausts into the forming chamber through the opening 11 in its top. One advantage of feeding the cut strands into the forming chamber directly from the chopper is the rate at which they are fed thereto can be easily regulated by controlling the speed of the cutting roll 9.

Located within the forming chamber and directly below the severing mechanism 4 is a distributor 14 which disperses the cut strands within the forming chamber. This distributor is supported on a ledge 16 beneath which is located a belt or chain to connect it to the driving motor 15. The distributor comprises an upright conically shaped main body which is mounted so that it may be rotated by the belt or chain. The falling lengths of strands are contacted by a number of finger or spike-like members 17 which extend from the conical body. These finger-like members 17 are of varying length and contour with those in the lower rows projecting farther outward than those in the upper rows. In operation the distributor is rotated at high speeds by the motor 15 and the projecting finger-like members 17 engage or flair the falling lengths of strands thereby breaking up the stream and projecting the strands laterally outward and distributing them within the forming chamber. Because the finger-like members 17 are varied as to location, configuration, and length they act upon different portions of the stream of strands and give different trajectories to the strands contacted.

Binder 31 is sprayed into the forming chamber through nozzles 25 to adhere the strands together at their interstices. The strands and binder are then collected together in the form of a loosely bonded mass on a mold 27 located near the bottom of the forming chamber.

In the normal operation of the distributor many of the strands are thrown outward by the distributor with a velocity such that they contact the sides of the forming chamber. The binder 31 which is sprayed on them will adhere many of them to the sides of the chamber. These strands will, during any prolonged period of operation, eventually accumulate on the sides of the forming chamber in thick layers, necessitating periodically shutting down the operation to permit cleaning of the strands and binder from the side walls.

Figure 3:
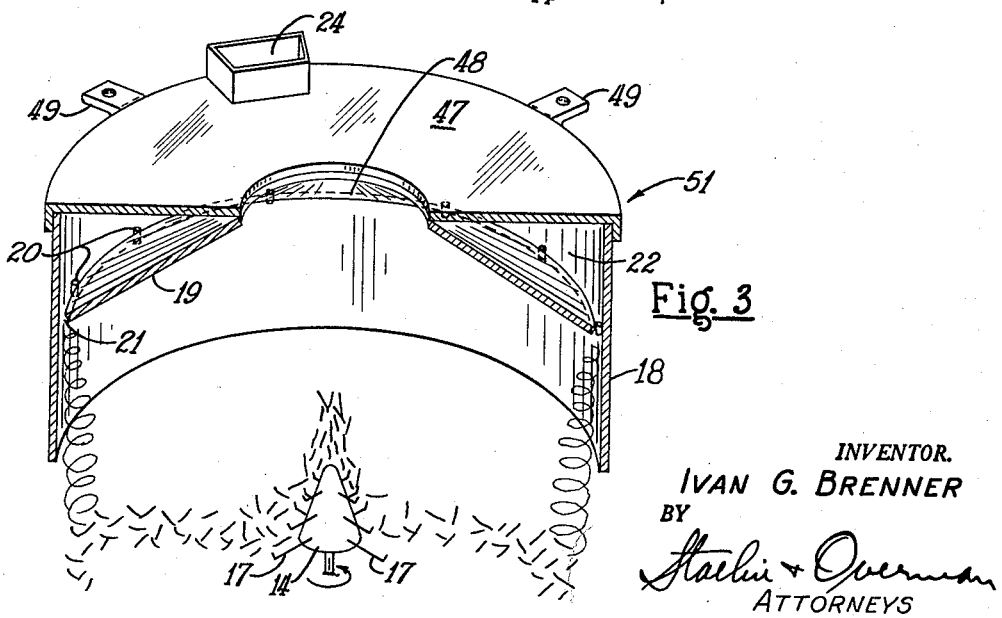
FIGURE 3 is an enlarged sectional view of a gas supply assembly of the type incorporated for controlling the fiber trajectory in the apparatus of FIGURES 1 and 2.

It has been found that this accumulation on the sides of the forming chamber can, for practical purposes, be eliminated by providing a gaseous stream in surrounding or encompassing relation with the strands moving within the forming chamber. This gaseous stream is supplied from a gas supply assembly 51 located near the top of the forming chamber. A preferred form of this gas supply assembly as illustrated in FIGURE 3 comprises a plenum chamber made of a cylindrically shaped, vertically disposed outside wall or guide 18, and an inside conical or outwardly flaring member 19. The outside diameter of the conical member 19 is slightly less than the inside diameter of the cylindrical shield 18. Therefore, when they are fastened together, there is a narrow annular slot 21 between them. The members 18 and 19 are welded or bolted together and provided with a cover 47 to form a plenum chamber 22. Air and other gases are supplied to the plenum chamber 22 by way of a duct extending from a fan 23, and connected to the opening in the plenum chamber 22. The shield 18 and the flaring insert 19 are fastened together with spacers or shims 20 interposed between them, to assure that the edge of the member 19 is maintained equidistant from the cylindrical shield 18 thereby providing an annular opening 21 through which the air or other gases from the plenum chamber 22 are projected downwardly as a thin, fast moving, stream.

The entire assembly is mounted within the forming chamber and fastened to the top thereof by lugs 49 and bolts or screws passing therethrough. It is positioned so that it is substantially concentric with the opening 11 in the top of the forming chamber. Additional openings (not shown) may be placed in the top of the forming chamber, leading to the plenum chamber, to add other gases, vapors, or powders which will mix with the gases in the plenum chamber and treat or coat the strands in the forming chamber.

In preform machines constructed and operated according to the present invention contact of strand elements with the sides of the forming chamber is practically eliminated because the outward or lateral flight of those strands moving with sufficient velocity to reach the side walls is arrested by the stream of moving gases flowing downward from the plenum chamber. The ability of the stream of gases to arrest the outward flight of the fibers is dependent upon the kinetic energy and thickness of the stream as well as the weight of the gases and any other materials mixed therein. The stopping power of the stream may therefore be increased by (1) increasing the pressure in the plenum chamber 22 and correspondingly the velocity of the stream; (2) increasing the width of the opening 21 and therefore the amount of gas within the stream, (3) by using a heavier gas, or (4) by adding a powdered or liquid binder with the gases to increase their apparent specific gravity. In addition to arresting lateral movement of the fibers or strand lengths the gases will also act to entrain and convey the chopped strands or fibers to the zone in which they are to be collected.

Gases in the forming chamber are withdrawn therefrom through the foraminous, contoured mold 27 by a fan 29 which is connected to the underside of the mold by a duct 28. A screen 30 located over the exhaust opening of the fan 29 prevents any loose fibers or strands that may sift through the mold 27 from being discharged into the working area outside the forming chamber. As the air passes through the mold 27, the chopped strands 26 entrained therein are filtered out onto the contoured surface of the mold and are bound tightly to one another by the binder 31. The capacity of the fan 29 is such that a negative pressure is established below the foraminous mold thereby drawing the gases within the forming chamber to the mold and holding the strands to the mold surface.

In order to reduce turbulence within the forming chamber it is desirable to maintain the negative pressure below the foraminous mold at such a level as to remove more gases from the forming chamber than is supplied thereto from the plenum chamber. In addition to establishing a more uniform flow within the forming chamber, this removal of extra gases from the forming chamber also creates a negative pressure within the forming chamber relative to the surrounding work area. Openings 38 and 39 are provided in the sides of the forming chamber to cause air to flow into the forming chamber from the surrounding area. The air flows inward because of the negative pressure in the chamber. This inward flow of air beside aiding in preventing the escape of strands or binder from the forming chamber, aids in preventing the strands and binder from contacting the side walls of the forming chamber, and also provides additional air for entraining the strands and binder and conveying them to the collection zone. The amount of air entering through each of the openings is regulated by a pair of dampers 40 and 41. By raising or lowering each of these dampers and correspondingly increasing or decreasing the quantity of air flowing through a particular opening, it is possible to control the flow of air, strands, and binder within the forming chamber and consequently the distribution of the strands on the mold or conveyor. This is done to, in a sense, focus the strands and collect them on a desired area of the mold or conveyor. Thus, by nearly closing the openings on one side of the forming chamber and leaving those on the opposite side open, it is possible to direct a majority of the strands to one side of the collection surface.

The mold is mounted on a turntable 32 which rests on rollers 33. The turntable is rotated by a motor 34 through a frictional drive wheel 35 mounted on the motor shaft 36 and engaging a flange 37 which extends down from the face of the turntable. Rotation of the mold reduces the possibility of variations in distribution of the strands in the finished preform. Also, the number of binder spray nozzles may be reduced since the entire mold may be covered by a few nozzles located on one side of the forming chamber because the mold will rotate below them.

A door is provided in the side of the forming chamber to permit removal of the foraminous mold with the chopped strand covering for subsequent heat curing. If desired, the air that is blown into the forming chamber through the plenum chamber 22 can be heated to precure the binder while the mold is still in the forming chamber. A suitable source of such heated air is the exhaust from the curing oven. By precuring the binder in the forming chamber, it is possible to reduce the time necessary to subsequently fully cure the binder in the curing oven thus permitting a greater number of preforms to be cured in a given period in an oven. Attempts made to use heated air in prior art forming chambers have not proven successful because the strands and binder accumulated on the chamber walls were also subjected to the curing action of the hot air which promoted their full cure.

Figure 2:
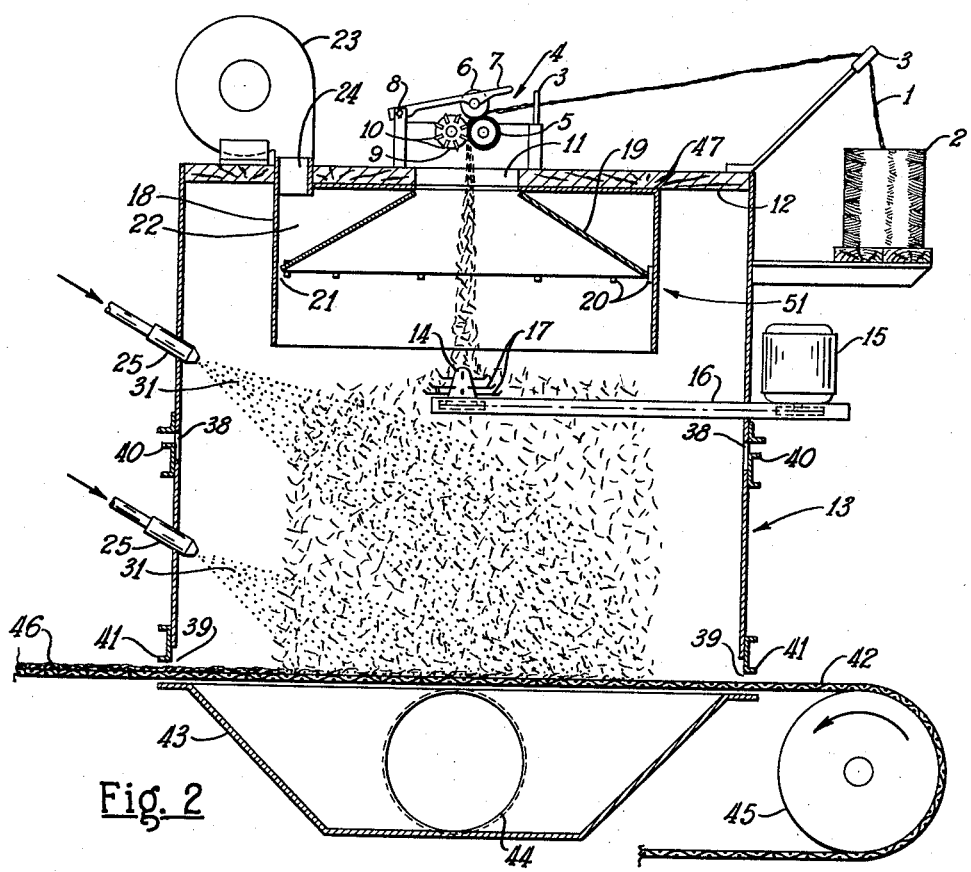
FIGURE 2 is a sectional elevation view of apparatus similar to that shown in FIGURE 1 which is adapted to produce a mat of fibrous materials.

FIGURE 2 shows an embodiment of this invention adapted to the production of a fibrous mat. As described in reference to FIGURE 1, the short lengths of strands from the chopper 4 are dispersed laterally throughout the forming hood by the distributor 14. Often several of these choppers are used to cut and feed the strands into the forming chamber. The stream of air from the plenum chamber 22 enters the forming chamber 13 through the opening 21, entrains and redirects the outermost short lengths of strands which would normally contact and become adhered to the sides of the forming chamber, and conveys them to a collecting surface such as a foraminous belt 42 to form a mat 46. Binder 31 is applied to the strands in the forming chamber through spray nozzles 25 to adhere them together as a mat. Additional binder is often advantageously applied to the mat outside the forming chamber by spraying or dipping it into a pool of the binder. The mat is carried by the foraminous belt 42 to a conventional curing oven (not shown) to cure the binder.

The gases in the forming chamber 13 are drawn through the foraminous belt 42, into the vacuum chamber 43 and exhausted therefrom through the duct 44. This movement of the gases is effected by a fan (not shown) that draws the air from the vacuum chamber 43 through the exhaust duct 44. When it is necessary to prevent air from entering the forming chamber near the foraminous collecting surface the dampers 41 may be replaced by vertically adjustable rolls which will rest on the foraminous chain 42 thereby effectively sealing the opening 39. Other forms of glass fibers such as continuous strands or yarns may be introduced into the forming hood to impart additional strength to the mat 46. Fibers of other materials such as organic resins like polyesters, nylon, etc. may also be introduced for improvement of specific predetermined properties in the mat.

The foraminous collecting belt 42 is normally moved at a constant speed by a driven supporting sprocket or drum 45. By increasing or decreasing the speed of the chain, it is possible to produce a thinner or thicker mat without changing the speed of the chopper 4 or the number of strands 1 fed thereto. Conversely, by maintaining the speed of the belt 42, constant and changing the speed of the choppers 4 or the number of strands 1 fed thereto, the thickness of the mat 46 can be controlled.

The gases from the plenum chamber 22 will flow through the foraminous belt 42 in the zones where the fewest strand lengths have been previously deposited since the resistance to the passage of the gases is usually the lowest in such zones. The strands entrained in the gases will be carried to these thin portions of the mat and filtered out onto the foraminous belt 42, thereby building up these thin sections of the mat and producing a more uniform mat.

As a possible variation it has been found advantageous in some instances to locate the plenum chamber entirely outside the forming chamber and inject the gases into the forming chamber through openings in its top 12. Also, the particular dimensions and configuration of the plenum chamber 22 may be varied to conform generally to the particular shape of the mold 27. Thus, if the diameter of the mold 27 is increased, it is often desirable to increase the diameter of the plenum chamber. For some products, the side wall 18 of the plenum chamber may be eliminated and the member 19 extended into close proximity with the sides of the forming chamber, with the opening 21 being extensive therewith. With such an arrangement, the air stream is released in immediate adjacent and coextensive relation with the side walls of the forming chamber.

Another advantageous modification of the described arrangement is a reduction in the number of binder spray guns 25 or their elimination by introducing binder in the form of resinous fibers along with the glass strand lengths to hold the strands togther. Thus, resinous fibers of relatively low melting compositions can be supplied to the severing mechanism 4, for cutting and supplied to the collection zone simultaneously with the chopped lengths of glass strands. Upon subsequent heating of the combination of the glass and resinous fibers the resinous fibers will soften or melt and upon cooling securely adhere the glass fibers together as a integrated mass. The glass fibers may also be bonded together by a binder that is applied to the strands or rovings before they are cut into short lengths. Such an application of binder can be accomplished by dipping or roll coating the strands as they are being drawn from the creel. All or only a portion of the total number of the strands or rovings can be coated and in some cases it may be desired to coat only a portion of the total length of the strands.

Although the preceding invention was described with reference to the production of a fibrous article from substantially continuous filaments which are adhered together to form a strand and then cut into short lengths it should be understood the present invention is not intended to be specifically limited thereto and that the arrangement may also be used to produce articles from other forms of fibers such as individual discontinuous fibers or filaments. Also, the particular distributor for dispersing the fibers within the forming chamber may be replaced by other types of dispersing mechanisms. It is intended that these and other modifications may be resorted to within the spirit of the invention and the scope of the appended claims.

I claim:

1. A method of preparing fibrous reinforcing masses for molded resinous articles comprising feeding a plurality of substantially continuous multifilament strands to a cutting mechanism, cutting said strands into short lengths, introducing said short lengths of strands into an enclosed space and releasing them for a free fall therein, disrupting the free fall of said short lengths of strands by moving at least a portion of them laterally outward in all directions within said space, directing a gaseous stream in encompassing relation about said laterally moving strands, said gaseous stream being arranged to have sufficient kinetic energy to restrain said laterally moving strands from passing therethrough, entraining at least some of said laterally moving strands in said gaseous stream, conveying said entrained strands to a foraminous collection surface, depositing a binding agent on said fibers withdrawing said gaseous stream from said enclosed space through said foraminous collection surface and collecting all of said strands in integrated relation on said surface.

2. A method of forming fibrous reinforcing masses for molded plastic articles comprising feeding fibers into an enclosed space and releasing them for free fall therein, striking said freely falling fibers with moving members to deflect at least some of said fibers laterally within said enclosed space, blowing a gaseous stream into said enclosed space in encompassing relation with said laterally moving fibers, said gaseous stream having a kinetic energy sufficient to limit the extent of lateral movement of substantially all of said fibers introduced therein to prevent their contacting the side walls of said enclosed space, drawing additional gases into said enclosed space through openings in its walls to control the flow of gases and strands within said enclosed space, withdrawing all of said gases from said enclosed space through a foraminous surface near the bottom of said enclosed space and simultaneously collecting said fibers on said foraminous surface.

3. A method of producing within an enclosed space a fibrous reinforcing element for molded resinous articles comprising, feeding substantially continuous glass filaments to a severing mechanism located above said enclosed space, severing said glass filaments into short lengths and introducing them into said enclosed space for a free fall therein, striking said freely falling fibers to project at least a portion of them laterally outward in all directions within said enclosed space, projecting a stream of gases downward within said enclosed space in encompassing relation with said fibers therein, said gaseous stream having a kinetic energy sufficient to prevent the passage of said laterally outward moving fibers therethrough, entraining at least some of said laterally moving fibers in said downwardly moving gaseous stream, withdrawing said gases in said enclosed space through a moving foraminous surface near the bottom of said enclosed space and collecting said fibers on said foraminous surface.

4. A method of producing a preformed fibrous article comprising releasing a supply of discontinuous fibers above a fiber collecting surface, projecting a fast moving annular stream of gases downward around said fibers in spaced relationship therefrom, said annular stream of gases extending from near the point of release of said fibers to said fiber collecting surface, striking at least some of said fibers to distribute them laterally within said annular stream, conveying said distributed fibers downward within said annular stream of gases to said fiber collecting surface, and collecting said fibers in interfelted bonded relationship in said fiber collecting surface.

5. A method for producing a fibrous preform of discontinuous fibers comprising flowing a stream of discontinuous fibers into a walled chamber toward a foraminous fiber collection surface, projecting a curtain of gases toward said collection surface in circumscribing relation about said stream and in close adjacency with the walls of said chamber, said circumscribing curtain being of such cross sectional size and shape as to conform to the size and shape of the said collection surface, enlarging the cross sectional area of said concentrated stream of fibers within said circumscribing curtain to effect uniform distribution of said fibers throughout the cross sectional area within said circumscribing curtain of air, establishing a negative pressure zone on the side opposite the fiber deposition side of said collection surface to cause a flow of gases of said curtain through said collection surface, and distributing a binding agent throughout the mass of discontinuous fibers as said fibers are collected at said surface.

6. A process for producing a fibrous preform for reinforcement of molded resinous articles comprising feeding a plurality of substantially continuous multifilament strands to a cutting mechanism, cutting said strands into short lengths, introducing said short lengths of strands into an enclosed space and releasing them for free fall toward a foraminous fiber collecting surface, striking said freely falling fibers with moving members to deflect at least some of them laterally, blowing a stream of gases downward into said enclosed space in encompassing relationship about all of said laterally moving fibers, the area within said encompassing stream being of sufficient size that the short lengths of strands therein are deposited over the entire fiber collecting surface, said gaseous stream having sufficient kinetic energy to prevent the penetration therethrough of substantially all of said laterally moving fibers, depositing a suitable binding material with said fibers on said foraminous collecting surface, and withdrawing said encompassing gases from said enclosed space through said foraminous collecting surface.

7. Apparatus for producing fibrous masses for reinforcing resinous articles comprising a base section, an enclosed chamber mounted on said base section, fiber supply means adapted to meter and feed fibers to said enclosed chamber and disposed to release said fibers for free movement within said chamber, distributing means for dispersing said fibers through the cross section of said enclosed chamber, gas supply means disposed to feed a gaseous stream into said chamber in encompassing relationship with the fibers dispersed therein, a foraminous collecting surface in said chamber, means for maintaining a reduced gaseous pressure below said foraminous surface to effect a flow of gases to said region of reduced pressure through said foraminous surface from within said enclosed space.

8. Apparatus for producing a fibrous preform for molded plastic articles comprising a forming chamber, means for cutting continuous multifilament strands into short lengths and feeding said short lengths of multifilament strands into said forming chamber for free movement downward therein, gas supply means for projecting a gaseous stream in a generally downward direction within said chamber, said gaseous supply means being oriented to surround and confine the path of said short lengths of multifilament strands in said forming chamber, distributing means for redirecting the movement of at least some of the strands laterally upon their release into said forming chamber, a foraminous collecting surface below said forming chamber, and means for establishing a region of negative pressure below said foraminous surface to withdraw said gases from said forming chamber through said foraminous surface to effect a deposition of said strands on said foraminous surface.

9. Apparatus for producing fibrous preforms comprising an enclosed chamber having a foraminous collection surface defining at least a portion of one wall of said chamber, fiber supply means furnishing a stream of cut fibers moving in the general direction for deposition on said foraminous collection surface, a distributor for spreading said fibers within said chamber laterally in all directions with respect to the direction of flow of said stream of fibers, a plenum chamber surrounding said stream of fibers generally at the zone of introduction of said fibers into said chamber, said plenum chamber having an annular opening for projection of an encompassing stream of gases around said stream of fibers in the general direction of movement of said stream, gas supply means associated with said plenum chamber to supply of gas for pressurized emission from said annular opening, and suction means positioned on the side opposite said foraminous collection surface for withdrawing gases from said enclosed chamber through said collection surface.

References Cited in the file of this patent
UNITED STATES PATENTS

| | | |
|---|---|---|
| 2,653,355 | Essman | Sept. 29, 1953 |
| 2,725,601 | Brenner | Dec. 6, 1955 |
| 2,929,436 | Hampshire | Mar. 22, 1960 |
| 2,931,422 | Long | Apr. 5, 1960 |
| 2,983,303 | Voss | May 9, 1961 |

FOREIGN PATENTS

| | | |
|---|---|---|
| 566,851 | Belgium | May 14, 1958 |